(12) United States Patent
Ueki et al.

(10) Patent No.: US 12,231,748 B2
(45) Date of Patent: Feb. 18, 2025

(54) INFORMATION PROCESSING DEVICE, INFORMATION PROCESSING METHOD, AND PROGRAM

(71) Applicant: Sony Group Corporation, Tokyo (JP)

(72) Inventors: Kenichiro Ueki, Tokyo (JP); Takuya Yamamoto, Tokyo (JP); Haruna Isobe, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 34 days.

(21) Appl. No.: 18/246,909

(22) PCT Filed: Oct. 8, 2020

(86) PCT No.: PCT/JP2020/038143
§ 371 (c)(1),
(2) Date: Mar. 28, 2023

(87) PCT Pub. No.: WO2022/074788
PCT Pub. Date: Apr. 14, 2022

(65) Prior Publication Data
US 2023/0353846 A1    Nov. 2, 2023

(51) Int. Cl.
*H04N 21/8549*    (2011.01)
(52) U.S. Cl.
CPC .............. *H04N 21/8549* (2013.01)
(58) Field of Classification Search
CPC .................................................. H04N 21/8549
See application file for complete search history.

(56) References Cited

U.S. PATENT DOCUMENTS

| 10,290,320 B2 | 5/2019 | Hu |
| 11,205,458 B1* | 12/2021 | Torres ............. H04N 5/2222 |
| 2005/0217462 A1* | 10/2005 | Thomson ............. G10H 1/368 |
| | | 84/612 |
| 2015/0312652 A1 | 10/2015 | Baker |

FOREIGN PATENT DOCUMENTS

| JP | 2002-142189 A | 5/2002 |
| JP | 2005-109566 A | 4/2005 |
| JP | 2007-294020 A | 11/2007 |
| JP | 2011-082915 A | 4/2011 |
| JP | 2015-192336 A | 11/2015 |

OTHER PUBLICATIONS

International Search Report and Written Opinion mailed on Dec. 22, 2020, received for PCT Application PCT/JP2020/038143, filed on Oct. 8, 2020, 10 pages including English Translation.

* cited by examiner

*Primary Examiner* — Thai Q Tran
*Assistant Examiner* — Jose M Mesa
(74) *Attorney, Agent, or Firm* — XSENSUS LLP

(57) ABSTRACT

An information processing device (100) includes a scene extraction unit (1333) and a generation unit (134). The scene extraction unit (1333) extracts a plurality of highlight scenes from content information related to movie content based on each of a plurality of generation rules for generating a highlight movie. The generation unit (134) connects the plurality of highlight scenes to generate a highlight movie.

14 Claims, 13 Drawing Sheets

FIG.5

| PRIOR-ITY | RULE R1 | RULE R2 | RULE R3 | RULE R4 | RULE R5 |
|---|---|---|---|---|---|
| 1 | SOLO CLOSE-UP OF LEADING CHARACTER | SOLO APPEARANCE OF PROTAGONIST IN STORY (OTHER THAN LEADING CHARACTER) | PRESENT ENEMY SUB-CAST NOT APPEARING IN BLOCK B1 OR B2 IN ORDER OF PERFORMANCE TIME PERIOD | PRESENT ALLY SUB-CAST NOT APPEARING IN BLOCKS B1 TO B3 IN ORDER OF PERFORMANCE TIME PERIOD | SOLO CLOSE-UP OF LEADING CHARACTER |
| 2 | SOLO CLOSE-UP OF SUB-LEADING CHARACTER | PRESENT SUB-CAST OF GROUP TO WHICH PROTAGONIST OF STORY BELONGS IN ORDER OF PERFORMANCE TIME PERIOD | PRESENT CAST NOT APPEARING IN BLOCK B1 OR B2 AS PERSON OTHER THAN LEADING CHARACTER | SCENE WITH HIGH SOUND EXCITEMENT | |
| 3 | SOLO CLOSE-UP OF SUB-CAST AS ALLY | SCENE INCLUDING PERFORMANCE OF PLURALITY OF PERSONS INCLUDING PROTAGONIST OF STORY/SUB-CAST | | SCENE INCLUDING CAST AND LEADING CHARACTER WITH LONG PERFORMANCE TIME PERIOD | |
| 4 | | | | PRESENT CAST WITH LONG TIME PERIOD OF APPEARANCE IN ORDER OF PERFORMANCE TIME PERIOD | |

FIG.6

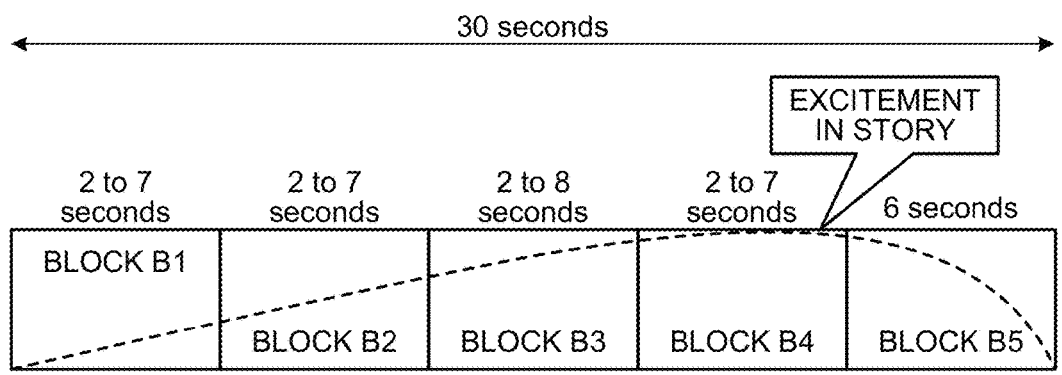

| PER-FORMER | TITLE | AFFILIATION GROUP | PERFOR-MANCE TIME PERIOD | IMPOR-TANCE | RELATION |
|---|---|---|---|---|---|
| aa aa | AA AA | GROUP G1 | 0:25:34 | LEADING CHARACTER | |
| bb bb | BB BB | GROUP G1 | 0:17:22 | MAIN | ALLY |
| ⋮ | | | | | |
| ee ee | EE EE | GROUP G2 | 0:37:57 | MAIN | ENEMY |
| ⋮ | | | | | |
| hh hh | HH HH | GROUP G3 | 0:07:41 | SUB | |

| SCENE | CHARACTER | AFFILIATION GROUP | SCREEN OCCUPANCY | SHOT | REMARKS |
|---|---|---|---|---|---|
| #1 | AA AA | GROUP G1 | LARGE | GROUP SHOT | |
| | BB BB | GROUP G1 | SMALL | | |
| | DD DD | GROUP G1 | INTERMEDIATE | | |
| #2 | AA AA | GROUP G1 | LARGE | CLOSE-UP | |
| #11 | AA AA | GROUP G1 | SMALL | FULL-SHOT | EXCITEMENT |
| #275 | AA AA | GROUP G3 | SMALL | MASS-SHOT | |
| | BB BB | GROUP G1 | SMALL | | |
| | CC CC | GROUP G1 | SMALL | | |
| | DD DD | GROUP G1 | SMALL | | |
| | ... | | SMALL | | |

| BLOCK B1 | BLOCK B2 | BLOCK B3 | BLOCK B4 | BLOCK B5 |
|---|---|---|---|---|
| 2 seconds | 7 seconds | 8 seconds | 7 seconds | 6 seconds |
| FINAL EPISODE OF DRAMA COMING | HH PRESENTING NEW EVIDENCE | BB DRIVEN INTO END GAME | HOW LAWSUIT ENDS? | DRAMA ○△ NOW ON STREAMING! |

FIG.14

| PRI-ORITY | RULE R1 | RULE R2 | RULE R3 | RULE R4 | RULE R5 |
|---|---|---|---|---|---|
| 1 | SOLO CLOSE-UP OF LEADING CHARAC-TER | SOLO SCENE HH | SOLO SCENE BB | PRESENT ALLY SUB-CAST NOT APPEARING IN BLOCKS B1 TO B3 IN ORDER OF PERFORMANCE TIME PERIOD | SOLO CLOSE-UP OF LEADING CHARAC-TER |
| 2 | SOLO CLOSE-UP OF SUB-LEADING CHARAC-TER | PRESENT SUB-CAST OF GROUP TO WHICH HH BELONGS IN ORDER OF PERFOR-MANCE TIME PERIOD | PRESENT SUB-CAST OF GROUP TO WHICH BB BELONGS IN ORDER OF PERFOR-MANCE TIME PERIOD | SCENE WITH HIGH SOUND EXCITEMENT | / |
| 3 | SOLO CLOSE-UP OF SUB-CAST AS ALLY | SCENE INCLUDING PERFOR-MANCE OF PLURALITY OF PERSONS INCLUDING HH/SUB-CAST | SCENE INCLUDING PERFOR-MANCE OF PLURALITY OF PERSONS INCLUDING BB/SUB-CAST | SCENE INCLUDING CAST AND LEADING CHARACTER WITH LONG PERFORMANCE TIME PERIOD | / |
| 4 | / | / | / | PRESENT CAST WITH LONG TIME PERIOD OF APPEARANCE IN ORDER OF PERFORMANCE TIME PERIOD | / |

FIG.15

INFORMATION PROCESSING DEVICE, INFORMATION PROCESSING METHOD, AND PROGRAM

CROSS-REFERENCE TO RELATED APPLICATION

The present application is based on PCT filing PCT/JP2020/038143, filed Oct. 8, 2020, the entire contents of which are incorporated herein by reference.

FIELD

The present disclosure relates to an information processing device, an information processing method, and a program.

BACKGROUND

There is a technique having been developed for generating a highlight movie from a piece of content including images and the like based on a user's instruction. Examples of the above technique include a technique described in the following Patent Literature 1.

CITATION LIST

Patent Literature

Patent Literature 1: JP 2011-82915 A

SUMMARY

Technical Problem

In addition to the purpose of confirming an outline of a large amount of image content or missed content as in the above-described technology, a highlight movie is also generated for the purpose of promoting viewing of the content.

Although there is a demand for a technology capable of easily generating a highlight movie for the purpose of promoting content viewing, it is difficult, with the conventional technology, to obtain a promoting effect of content viewing because highlight movies generated by the technology are images just for confirming details of the content.

In view of this, the present disclosure proposes an information processing device, an information processing method, and a program capable of more easily generating a highlight movie that is highly effective in promoting content viewing.

Note that the above problem or target is merely one of a plurality of problems or targets that can be solved or achieved by a plurality of embodiments disclosed in the present specification.

Solution to Problem

According to the present disclosure, an information processing apparatus is provided. The information processing device includes a scene extraction unit and a generation unit. The scene extraction unit extracts a plurality of highlight scenes from content information related to movie content based on each of a plurality of generation rules for generating a highlight movie. The generation unit connects the plurality of highlight scenes to generate a highlight movie.

BRIEF DESCRIPTION OF DRAWINGS

FIG. 5 is a diagram illustrating an example of rule information acquired by a rule acquisition unit according to the embodiment of the present disclosure.

FIG. 6 is a diagram illustrating an example of a generation condition acquired by a condition acquisition unit according to the embodiment of the present disclosure.

FIG. 14 is a diagram illustrating an example of correction by a rule correction unit according to the embodiment of the present disclosure.

FIG. 15 is a diagram illustrating an example of a highlight movie generated by a generation unit according to the embodiment of the present disclosure.

DESCRIPTION OF EMBODIMENTS

Hereinafter, embodiments of the present disclosure will be described in detail with reference to the accompanying drawings. Note that redundant descriptions will be omitted from the present specification and the drawings by assigning the same reference signs to components having substantially the same functional configuration.

One or more embodiments (examples and modifications) described below can each be implemented independently. On the other hand, at least some of the plurality of embodiments described below may be appropriately combined with at least some of other embodiments. The plurality of embodiments may include novel features different from each other. Accordingly, the plurality of embodiments can contribute to achieving or solving different objects or problems, and can exhibit different effects.

Note that the description will be provided in the following order.

1. Outline of Information Processing Method
2. Information Processing System
   2.1. Configuration Example of Information Processing System
   2.2. Configuration Example of Analysis Device
   2.3. Configuration Example of Information Processing Device
3. Generation Processing
4. Other Embodiments
5. Hardware Configuration
6. Conclusion <<1. Outline of Information Processing Method>>

A case where the processing related to the information processing method according to the present embodiment is performed by an information processing device 100 according to the present embodiment will be described as an example.

Hereinafter, an example in which the information processing method according to the present embodiment is applied to a case of generating a highlight movie of a drama will be mainly described. The application example of the information processing method according to the present embodiment is not limited thereto. The example to which the information processing method according to the present embodiment is applied is not limited to highlight movie generation of a drama, and can also be applied to highlight movie generation of movie content such as a motion picture, for example.

Figure 1:
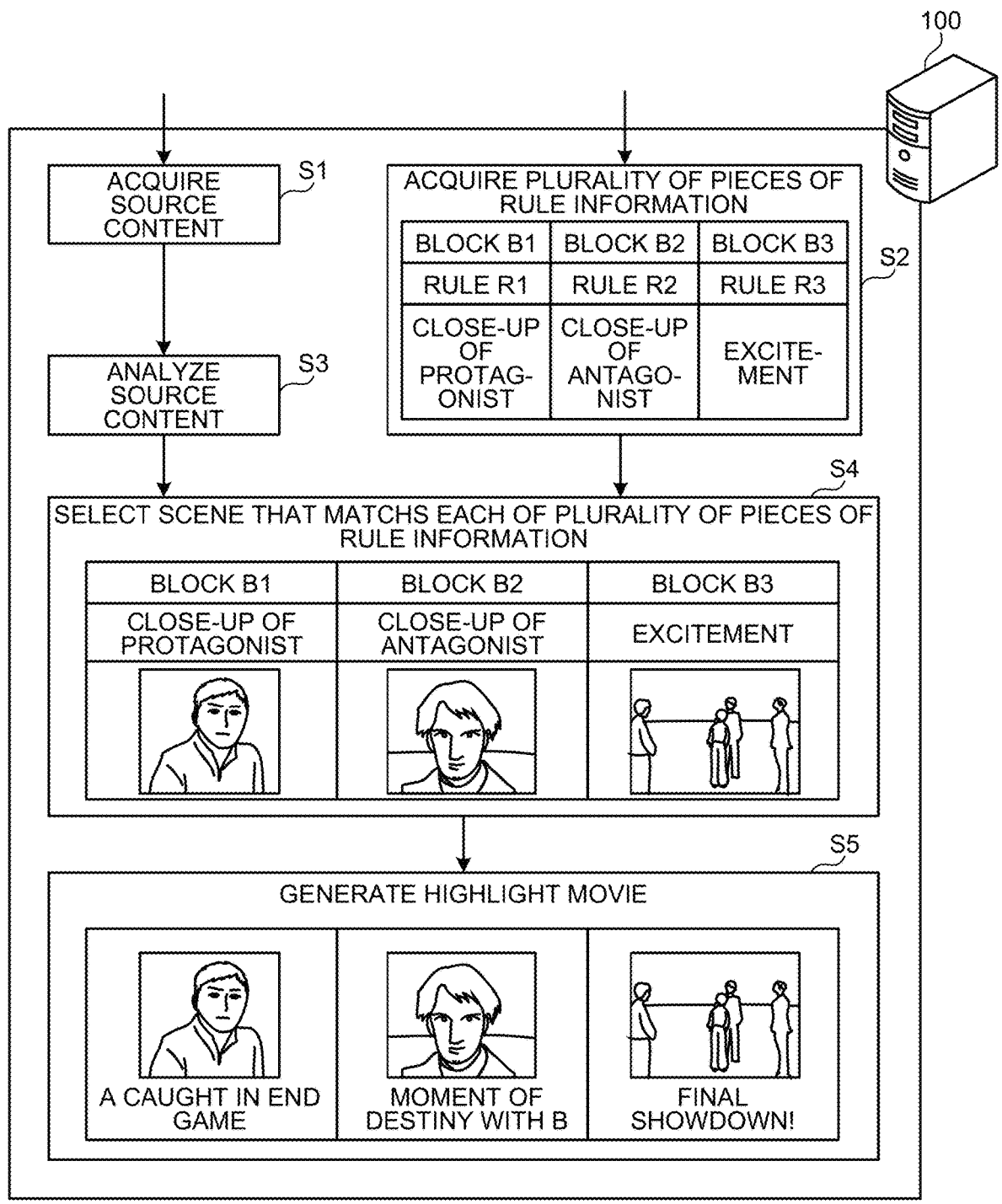
FIG. 1 is a diagram illustrating an outline of an information processing method according to an embodiment of the present disclosure.

FIG. 1 is a diagram illustrating an outline of an information processing method according to an embodiment of the present disclosure. In the information processing method according to the present embodiment, the information processing device 100 generates a highlight movie of a drama.

As illustrated in FIG. 1, the information processing device 100 acquires movie content being a generation target of a highlight movie (hereinafter, also referred to as source content) (step S1). The information processing device 100 acquires source content uploaded from a user, for example.

Next, the information processing device 100 acquires a plurality of pieces of rule information (step S2). The rule information includes a generation rule for generating a highlight movie.

In the example of FIG. 1, the information processing device 100 generates a highlight movie divided in three blocks B1 to B3. In this case, the information processing device 100 acquires rules R1 to R3 for each of the blocks B1 to B3, respectively. The rules R1 to R3 are rules for extracting content data for generating a highlight movie from the source content, for example. For example, the rule R1 is "close-up of protagonist", the rule R2 is "close-up of antagonist", and the rule R3 is "excitement".

Subsequently, the information processing device 100 analyzes the acquired source content (step S3). The information processing device 100 analyzes the source content using, for example, an analysis device (not illustrated) that analyzes the movie content. The information processing device 100 acquires source content after analysis (hereinafter, also referred to as analyzed content) in which scenes are divided by speech recognition, face recognition, subtitle recognition, or the like, and related information has been attached for each scene as a tag, for example.

The information processing device 100 selects a scene that matches each of the plurality of pieces of rule information (rules R1 to R3) from the analyzed content for each of the blocks B1 to B3 (step S4). Note that a plurality of scenes may be selected. The information processing device 100 extracts at least one scene selected, as content data (an example of a highlight scene) of each of the blocks B1 to B3.

For example, the rule R1 corresponding to the block B1 is "taking close-up of protagonist". Therefore, the information processing device 100 selects a scene to which the information regarding the protagonist is attached as the content data corresponding to the block B1. Similarly, the information processing device 100 selects a scene to which the information regarding the antagonist is attached as the content data corresponding to the block B2.

Furthermore, the information processing device 100 selects a scene estimated to have a highest excitement as the content data corresponding to the block B3. For example, the information processing device 100 estimates an excitement scene based on sound information attached to the source content. For example, the information processing device 100 estimates, as the excitement scene, a scene having a greatest height in a wavelength of the sound of the source content, in other words, having a greatest amplitude fluctuation.

The information processing device 100 connects pieces of the extracted content data to generate a highlight movie (step S5). At this time, the information processing device 100 may attach textual information regarding the source content to the highlight movie as a subtitle, for example.

In a conventional method of generating a highlight movie, the highlight movie has been generated based on one piece of rule information such as "excitement". Although the highlight movie generated based on one piece of rule information in this manner is suitable for grasping an outline of the source content, it has been difficult, with this generation method, to achieve a high effect of promoting the viewing of the source content.

Therefore, in the information processing method of the present disclosure, the information processing device 100 extracts a plurality of pieces of content data from the source content based on each of the plurality of pieces of rule information, and generates a highlight movie by connecting the plurality of pieces of extracted content data.

By extracting a plurality of pieces of content data based on a plurality of pieces of rule information, the information processing device 100 can generate, for example, a highlight movie including a scene having a high effect of promoting content viewing, such as a character scene or an excitement scene of a drama.

In this manner, in the information processing method according to the present embodiment, the information processing device 100 can more easily generate a highlight movie having a higher effect of promoting content viewing.

<<2. Information Processing System>>

<2.1. Configuration Example of Information Processing System>

Figure 2:
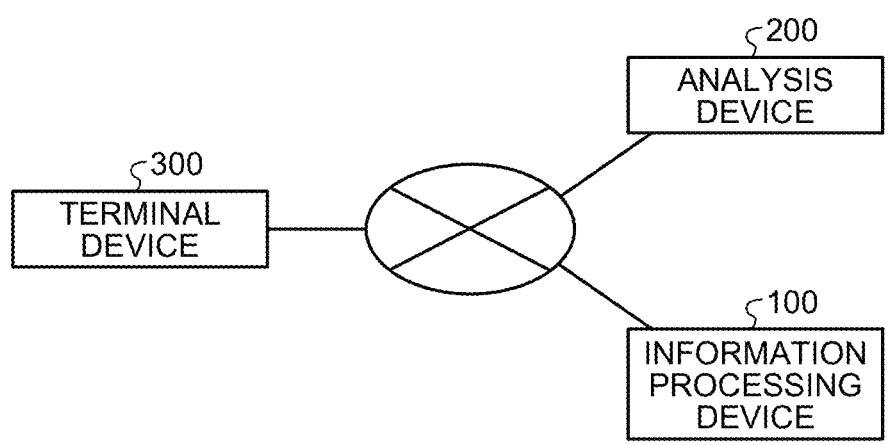
FIG. 2 is a diagram illustrating a configuration example of an information processing system according to the embodiment of the present disclosure.

FIG. 2 is a diagram illustrating a configuration example of the information processing system according to the embodiment of the present disclosure. The information processing system illustrated in FIG. 2 includes an information processing device 100, an analysis device 200, and a terminal device 300. The information processing device 100, the analysis device 200, and the terminal device 300 are connected via a network as illustrated in FIG. 2, for example.

(Information Processing Device 100)

The information processing device 100 is a device (for example, the server device) that generates a highlight movie of source content. For example, the information processing device 100 acquires source content and a plurality of pieces of rule information from the terminal device 300. The information processing device 100 analyzes the acquired source content using the analysis device 200 and generates the analyzed content. The information processing device 100 generates a highlight movie from the analyzed content based on the rule information and outputs the highlight movie to the terminal device 300.

(Analysis Device 200)

The analysis device 200 is a device (for example, a server device) that analyzes source content. The analysis device 200 performs speech recognition, face recognition, subtitle recognition, and the like on the source content acquired by the information processing device 100, and generates various types of information (metadata). The analysis device 200 divides the source content into a plurality of scenes, and attaches information as a tag to each of the scenes. The analysis device 200 outputs an analysis result of the source content to the information processing device 100.

(Terminal Device 300)

The terminal device 300 is a device operated by the user, represented by an information processing terminal such as a smartphone, a personal computer (PC), or a tablet terminal. The terminal device 300 outputs source content, rule information, and information for generating a highlight movie such as a subtitle to be described below to the information processing device 100. The terminal device 300 acquires the highlight movie generated by the information processing device 100.

<2.2. Configuration Example of Analysis Device>

Figure 3:
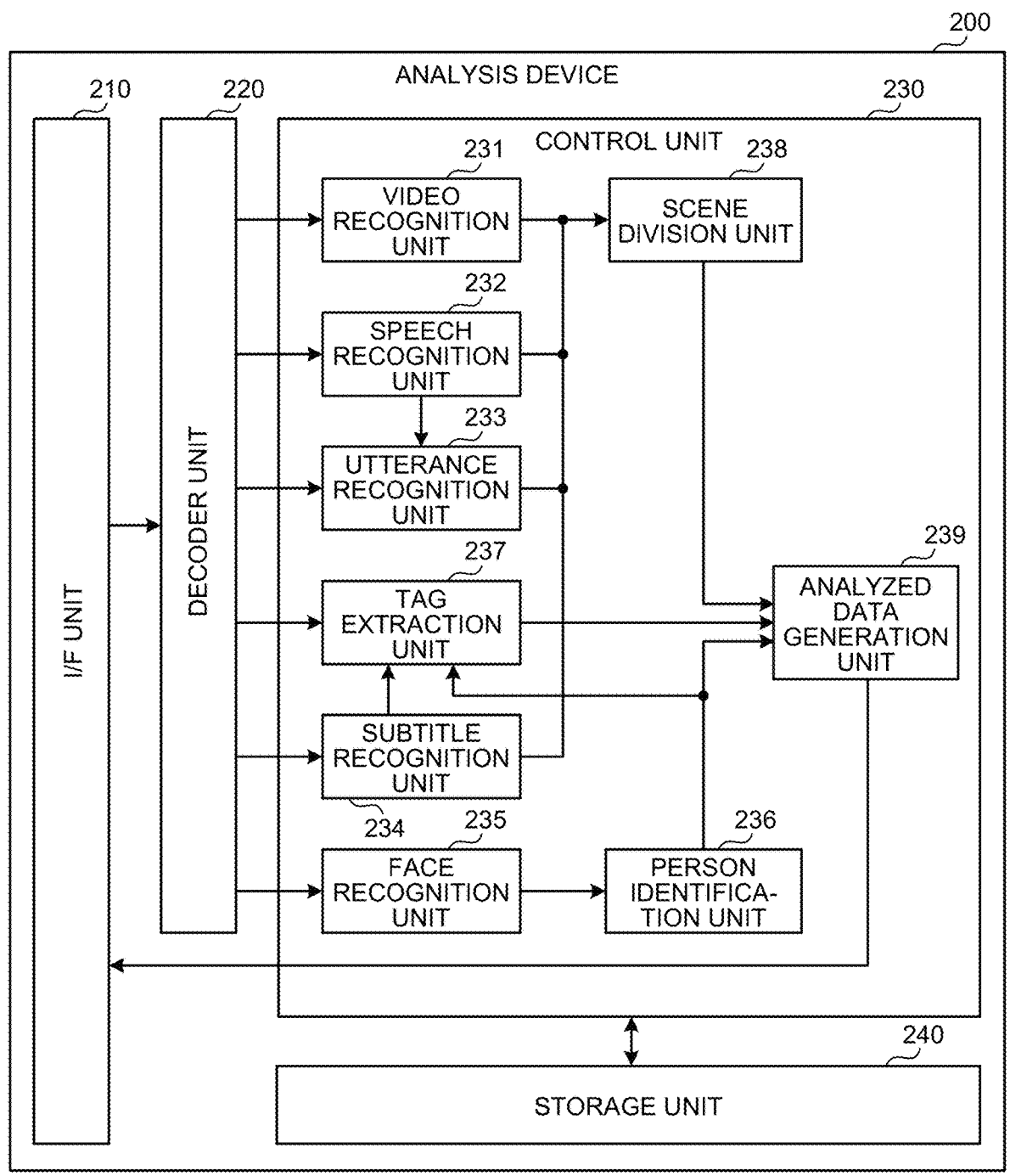
FIG. 3 is a diagram illustrating a configuration example of an analysis device according to the embodiment of the present disclosure.

FIG. 3 is a diagram illustrating a configuration example of the analysis device 200 according to the embodiment of the present disclosure. The analysis device 200 illustrated in FIG. 3 includes an interface (I/F) unit 210, a decoder unit 220, a control unit 230, and a storage unit 240.

(I/F Unit 210)

The I/F unit 210 is a communication unit connected to the information processing device 100 via a network. The I/F unit 210 is implemented by a network interface card (NIC), for example. The I/F unit 210 receives the movie data as source content from the information processing device 100.

(Decoder Unit 220)

The decoder unit 220 is a decoding unit that decodes the movie data received by the I/F unit 210.

(Control Unit 230)

The control unit 230 controls individual portions of the analysis device 200. The control unit 230 is implemented by execution of programs stored inside the analysis device 200 by a central processing unit (CPU), a micro processing unit (MPU), or the like, using random access memory (RAM) or the like, as a working area. Furthermore, the control unit 230 is actualized by, for example, an integrated circuit such as an application specific integrated circuit (ASIC) or a field programmable gate array (FPGA).

The control unit 230 includes a video recognition unit 231, a speech recognition unit 232, an utterance recognition unit 233, a subtitle recognition unit 234, a face recognition unit 235, a person identification unit 236, a tag extraction unit 237, a scene division unit 238, and an analyzed data generation unit 239. The control unit 230 implements or executes functions and operations of information processing described below. The internal configuration of the control unit 230 is not limited to the configuration illustrated in FIG. 3, and may be any other configuration as long as it is a configuration that performs information processing described below. Furthermore, the connection relationship of the processing units included in the control unit 230 is not limited to the connection relationship illustrated in FIG. 3, and may be a different connection relationship.

(Video Recognition Unit 231)

The video recognition unit 231 recognizes, for example, image switching from movie data. Furthermore, the video recognition unit 231 may recognize an object captured in a frame image or recognize a shooting location (indoor, outdoor, room, office, park, etc.).

(Speech Recognition Unit 232)

The speech recognition unit 232 extracts a speech from the sound information included in the source content, and performs speech recognition (Automatic Speech Recognition (ASR)) on the extracted speech to convert the utterance into text. For example, in a case where the source content is a drama, the speech recognition unit 232 extracts lines of characters in the drama, and converts the extracted lines into text.

(Utterance Recognition Unit 233)

The utterance recognition unit 233 performs, for example, natural language understanding (NLU) on the utterance converted into text by the speech recognition unit 232, and classifies the utterance into a noun, a verb, a qualifier, and the like.

(Subtitle Recognition Unit 234)

The subtitle recognition unit 234 extracts textual information (subtitle) superimposed on movie data, for example. For example, the subtitle recognition unit 234 can perform NLU on the extracted textual information and classify the textual information into a noun, a verb, a qualifier, and the like. The subtitle recognition unit 234 can recognize textual information included in a frame image such as a signboard or a printed matter, for example, in addition to the textual information superimposed on the movie data.

(Face Recognition Unit 235)

The face recognition unit 235 recognizes the face of the person captured in the frame image.

(Person Identification Unit 236)

The person identification unit 236 identifies a person recognized as a person having a face recognized by the face recognition unit 235. For example, the person identification unit 236 refers to a person database (not illustrated) in which information (for example, a name) related to a person and a face are associated with each other, and acquires information related to a person (hereinafter, also referred to as person information) corresponding to the face recognized by the face recognition unit 235, thereby identifying the person.

Alternatively, the person identification unit 236 may extract person information from the textual information recognized by the subtitle recognition unit 234 to identify the person. In this case, the person identification unit 236 can update the person database by associating the face of the identified person with the person information.

(Tag Extraction Unit 237)

The tag extraction unit 237 extracts metadata to be attached to the movie data as a tag from the utterance information recognized by the utterance recognition unit 233, the textual information recognized by the subtitle recognition unit 234, and the person information identified by the person identification unit 236.

(Scene Division Unit 238)

The scene division unit 238 divides the movie data into a plurality of scenes based on information such as the video recognition result by the video recognition unit 231, the speech information recognized by the speech recognition unit 232, the utterance information recognized by the utterance recognition unit 233, and the textual information recognized by subtitle recognition unit 234. For example, the scene division unit 238 divides the scene at the timing when the video is switched. Furthermore, the scene division unit 238 may divide the scene based on textual information or utterance information such as "Next" or "Now", for example. Furthermore, the scene division unit 238 analyzes the speech information and the utterance information, and divides the scene according to whether or not the topic of the speech is continuous.

(Analyzed Data Generation Unit 239)

The analyzed data generation unit 239 generates analyzed data, for example, by attaching metadata and person information as tags for each scene divided by the scene division unit 238. The analyzed data generation unit 239 transmits the generated analyzed data as analyzed content to the information processing device 100 via the I/F unit 210.

(Storage Unit 240)

The storage unit 240 is a recording device that stores a program executed by the control unit 230 and stores data necessary for executing the program. In addition, the storage unit 240 temporarily stores data for processing performed by the control unit 230. Furthermore, the storage unit 240 stores information to be used for processing performed by the control unit 230, such as a person database.

<2.3. Configuration Example of Information Processing Device>

Figure 4:
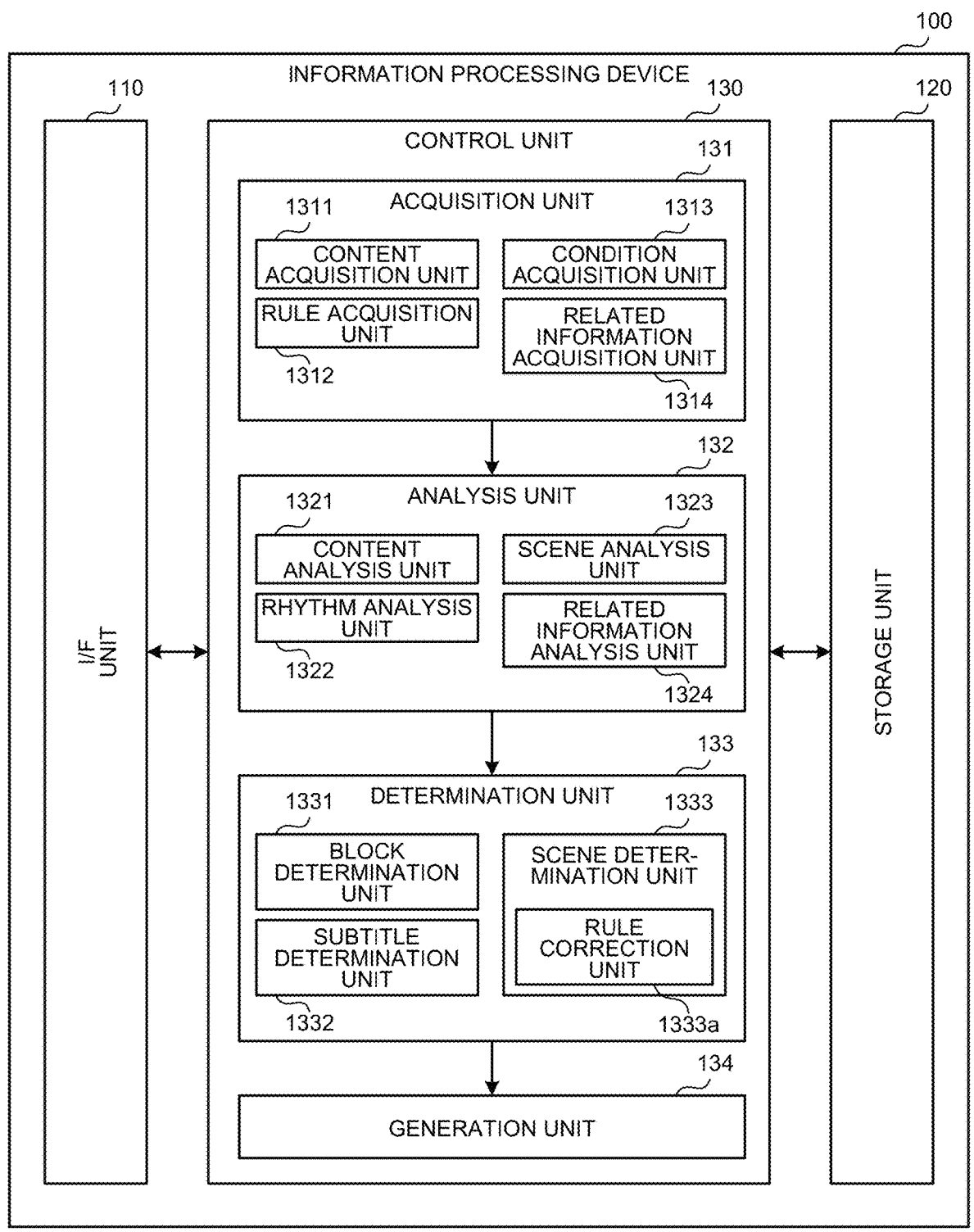
FIG. 4 is a diagram illustrating a configuration example of an information processing device according to the embodiment of the present disclosure.

FIG. 4 is a diagram illustrating a configuration example of the information processing device 100 according to the embodiment of the present disclosure. The information processing device 100 illustrated in FIG. 4 includes an interface (I/F) unit 110, a storage unit 120, and a control unit 130.

(I/F Unit 110)

The I/F unit 210 is a communication unit connected to the analysis device 200 and the terminal device 300 via a network. The I/F unit 110 is implemented by a network interface card (NIC), for example.

(Storage Unit 120)

The storage unit 120 is a recording device that stores a program executed by the control unit 130 and stores data necessary for executing the program. In addition, the storage unit 120 temporarily stores data for processing performed by the control unit 130.

(Control Unit 130)

The control unit 130 controls individual portions of the information processing device 100. The control unit 130 is implemented by execution of programs stored inside the information processing device 100 by a central processing unit (CPU), a micro processing unit (MPU), or the like, using random access memory (RAM) or the like, as a working area. Furthermore, the control unit 130 is actualized by, for example, an integrated circuit such as an application specific integrated circuit (ASIC) or a field programmable gate array (FPGA).

The control unit 130 includes an acquisition unit 131, an analysis unit 132, a determination unit 133, and a generation unit 134, and implements or executes functions and operations of information processing described below. Not limited to the configuration illustrated in FIG. 4, the internal configuration of the control unit 130 may have a different configuration as long as it performs information processing described below. Furthermore, the connection relationship of the processing units included in the control unit 130 is not limited to the connection relationship illustrated in FIG. 4, and may be a different connection relationship.

(Acquisition Unit 131)

The acquisition unit 131 acquires information used for generating a highlight movie from the terminal device 300 and the storage unit 120. The acquisition unit 131 includes a content acquisition unit 1331, a rule acquisition unit 1312, a condition acquisition unit 1313, and a related information acquisition unit 1314.

(Content Acquisition Unit 1331)

The content acquisition unit 1331 acquires, as the source content, movie content used for generating a highlight movie from the terminal device 300. The number of pieces of the movie content acquired by the content acquisition unit 1331 may be one, or two or more. For example, in a case where the movie content is a continuous drama or a series of motion pictures, the content acquisition unit 1331 can acquire a plurality of episodes of a drama or a plurality of series of motion pictures as the source content. When having acquired a plurality of pieces of movie content, the content acquisition unit 1331 may connect the acquired plurality of pieces of movie content to be handled as one source content.

(Rule Acquisition Unit 1312)

The rule acquisition unit 1312 acquires a plurality of pieces of rule information which are generation rules used for generating a highlight movie. The rule acquisition unit 1312 acquires a plurality of pieces of rule information instructed by the user from the terminal device 300.

Here, an example of a plurality of pieces of rule information acquired by the rule acquisition unit 1312 will be described with reference to FIG. 5. FIG. 5 is a diagram illustrating an example of rule information acquired by the rule acquisition unit 1312 according to the embodiment of the present disclosure.

The rule acquisition unit 1312 acquires the same number of pieces of rule information as the number of blocks (here, five) of the highlight movie. In the example of FIG. 5, the rule acquisition unit 1312 acquires rules R1 to R5 as a plurality of pieces of rule information.

One piece of rule information can include a plurality of rules (hereinafter, also described as detailed rules). For example, the rule R1 includes three detailed rules of "Solo close-up of leading character", "Solo close-up of sub-leading character", and "Solo close-up of sub-cast as ally". For example, priority is set to each of the detailed rules. In the rule R1, higher priority is given to "Solo close-up of leading character", "Solo close-up of sub-leading character", and "Solo close-up of sub-cast as ally" in this order. The priority illustrated in FIG. 5 is set such that the smaller the number, the higher the priority.

The number of detailed rules included in one piece of rule information is not limited to three, and may be two or less, or four or more.

The rule acquisition unit 1312 acquires a plurality of pieces of rule information for each block obtained by dividing the highlight movie into a plurality of pieces.

The rule information includes information related to characters of the source content, such as "leading character" and "sub-leading character". The rule information further includes information based on relationship information (for example, a relationship chart to be described below) indicating the relationship between the characters, such as "group to which the protagonist of the story belongs", "enemy", and "ally". This information is information for extracting characters belonging to the same group as a predetermined character (for example, the protagonist of the story, or the like) when a plurality of characters are classified into groups based on the relationship information. Here, the "protagonist of the story" is assumed to be a character who performs the most (longest) in the movie content, excluding the "leading character".

The rule information includes a generation rule according to at least one of the number of characters, the size of the characters in the screen (for example, "Solo close-up"), and the appearance time period of the characters (for example, "order of performance time period").

The rule information further includes a generation rule corresponding to the excitement of the movie content, such as "high excitement". The information processing device 100 estimates "excitement" of the movie content based on sound information of the movie content, for example, details of which will be described below.

In this manner, the rule information includes a generation rule for extracting content data suitable for each block.

(Condition Acquisition Unit 1313)

Returning to FIG. 4. The condition acquisition unit 1313 acquires a highlight movie generation condition. The condition acquisition unit 1313 acquires, from the terminal device 300, the length (in time) of the generated highlight movie and the number of blocks to be divided, for example.

The condition acquisition unit 1313 acquires sound information to be attached to the highlight movie from the terminal device 300, for example. The sound information is, for example, a piece of music or the like serving as background music of the highlight movie.

Furthermore, the condition acquisition unit 1313 acquires information regarding the length of each block and excitement in the story in the highlight movie.

Here, an example of the generation condition acquired by the condition acquisition unit 1313 will be described with reference to FIG. 6. FIG. 6 is a diagram illustrating an example of a generation condition acquired by the condition acquisition unit 1313 according to the embodiment of the present disclosure.

Having acquired the length of the highlight movie and the number of blocks to be divided, the condition acquisition unit 1313 acquires, according to the acquired conditions, the length of each block and the excitement condition of the story in the highlight movie to be generated, as a generation condition.

The example of FIG. 6 assumes that the condition acquisition unit 1313 has acquired the generation condition that the length of the highlight movie is 30 seconds and the number of divided blocks is five. In this case, the condition acquisition unit 1313 acquires the condition of the length of each of the five blocks B1 to B5.

At this time, the condition acquisition unit 1313 acquires a generation condition having a certain range as a condition of the length of the block. For example, the condition acquisition unit 1313 acquires 2 to 7 seconds as the generation condition as the condition of the length of the block B1. In this manner, the condition acquisition unit 1313 acquires the time in a certain range as the condition of the length of the block, making possible for the information processing device 100 to divide the highlight movie in accordance with the rhythm of the sound information (for example, background music) as described below.

Furthermore, the condition acquisition unit 1313 acquires an excitement in a story in the highlight movie as a generation condition (hereinafter, it is also described as an excitement condition). For example, in FIG. 6, the condition acquisition unit 1313 acquires a generation condition in which the excitement gradually increases from the block B1 and the excitement becomes highest in the block B4.

The condition acquisition unit 1313 acquires the generation condition from the storage unit 120, for example. In this case, the storage unit 120 is assumed to store information in which the length and the number of blocks of the highlight movie are associated with the generation condition.

Note that the condition acquisition unit 1313 may acquire the excitement condition based on sound information, for example. For example, the condition acquisition unit 1313 may acquire the excitement condition from the magnitude of the sound information (for example, background music), in other words, from level of amplitude. In this case, the condition acquisition unit 1313 acquires the excitement condition in which the excitement is low in the block with small sound and the excitement is high in the block with large sound.

(Related Information Acquisition Unit 1314)

Returning to FIG. 4. The related information acquisition unit 1314 acquires information related to the source content from another device (not illustrated) connected to a network, for example. The related information acquisition unit 1314 acquires content-related information such as a summary of the source content and a relationship chart from an official site of the source content, for example. The related information acquisition unit 1314 further acquires the description related to the source content as the content-related information from a program guide, for example. The description related to source content, such as a summary of the source content and a program guide, is also described as textual content.

(Analysis Unit 132)

The analysis unit 132 analyzes each piece of information acquired by the acquisition unit 131. The analysis unit 132 includes a content analysis unit 1321, a rhythm analysis unit 1322, a scene analysis unit 1323, and a related information analysis unit 1324.

(Content Analysis Unit 1321)

The content analysis unit 1321 analyzes the source content using the analysis device 200. The content analysis unit 1321 can perform content analysis for generating a highlight movie in addition to the analysis using the analysis device 200. For example, the content analysis unit 1321 calculates the cumulative total of the performance time period of the performer.

(Related Information Analysis Unit 1324)

The related information analysis unit 1324 analyzes the related information acquired by the related information acquisition unit 1314. The related information analysis unit 1324 can perform NLU on textual information such as a summary of the source content or a program guide, and can classify the textual information into a noun, a verb, a qualifier, or the like.

Furthermore, the related information analysis unit 1324 analyzes the characters such as the importance and relationship of the characters from a relationship chart, for example. The related information analyzed by the related information analysis unit 1324 will be described with reference to FIG. 7.

Figure 7:
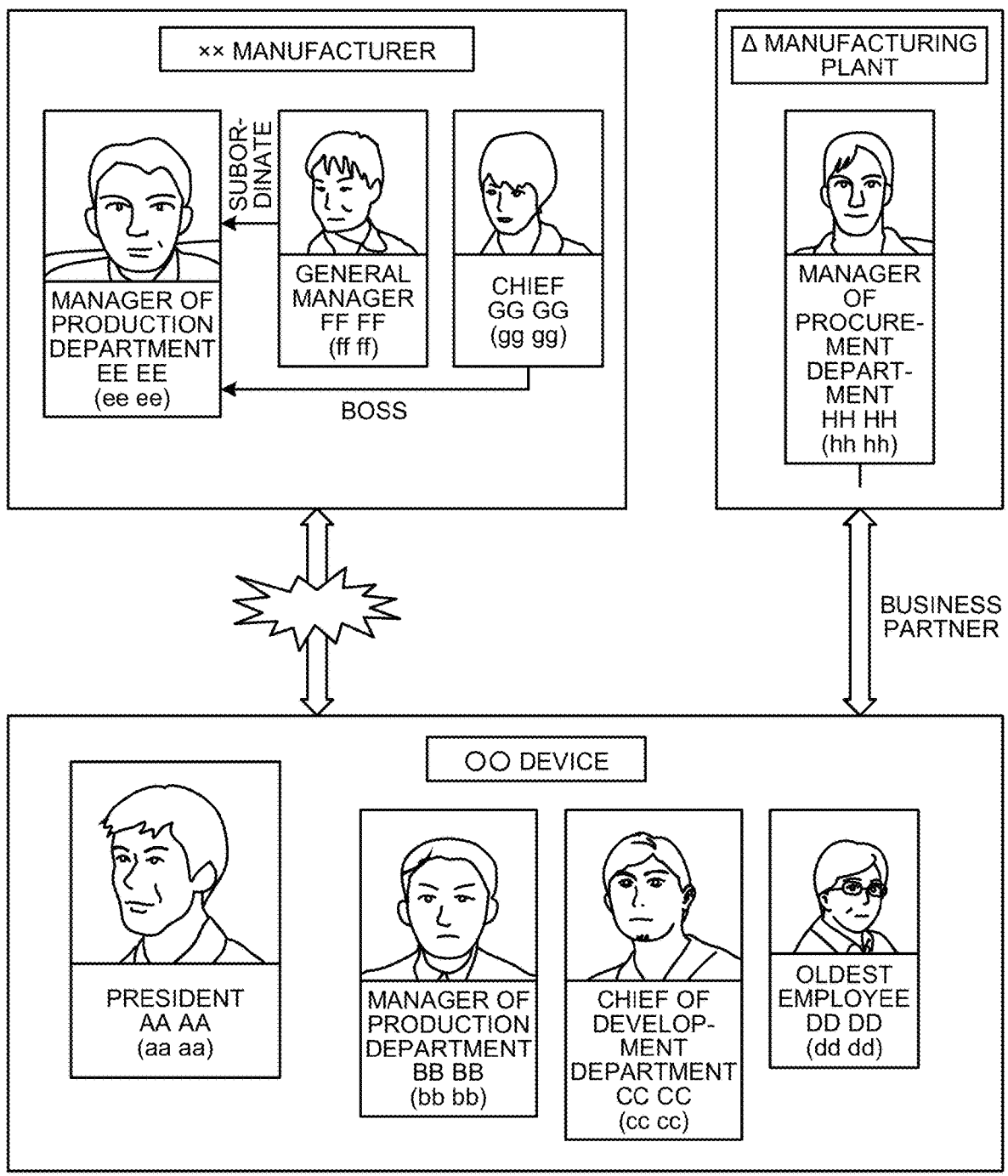
FIG. 7 is a diagram illustrating an example of related information analyzed by a related information analysis unit according to the embodiment of the present disclosure.

FIG. 7 is a diagram illustrating an example of related information analyzed by the related information analysis unit 1324 according to the embodiment of the present disclosure.

The related information analysis unit 1324 classifies the importance levels of the characters from a relationship chart, for example. Based on the size and position of the photograph of the relationship chart, the importance of the characters, for example, the leading character, main cast, or sub-cast is analyzed. For example, in FIG. 7, the related information analysis unit 1324 classifies "AA AA" in the largest photograph as a leading character. In addition, the related information analysis unit 1324 classifies characters with next largest photographs (for example, "EE EE" or "BB BB") as main cast, and classifies characters with small photographs (for example, "DD DD") as sub-cast.

Furthermore, the related information analysis unit 1324 classifies characters into a plurality of groups, for example, from a relationship chart. For example, the related information analysis unit 1324 classifies characters arranged in the same frame into one group. In the example of FIG. 7, the related information analysis unit 1324 classifies characters arranged in a frame described as "○○ device" (for example, "AA AA" or "BB BB") into a same group G1. In addition, characters arranged in a frame described as "×× manufacturer" (for example, "EE EE" and "FF FF") are classified into a same group G2.

Furthermore, the related information analysis unit 1324 classifies the relationship between the characters from the relationship chart, for example. The related information analysis unit 1324 classifies the relationship between the characters into "ally" and "enemy" based on textual information such as "enemy", "V.S.", and "competitor", a mark indicating a conflict, and the like included in the relationship chart.

In the example of FIG. 7, the related information analysis unit 1324 classifies characters belonging to the same group G1 (for example, "BB BB") as the leading character, as "ally" in the relationship with the leading character. In addition, the related information analysis unit 1324 classifies the character (for example, "EE EE") belonging to the group G2 ("×× manufacturer") marked as an enemy of the group G1 ("○○ device"), as "enemy".

Figures 8, 9:
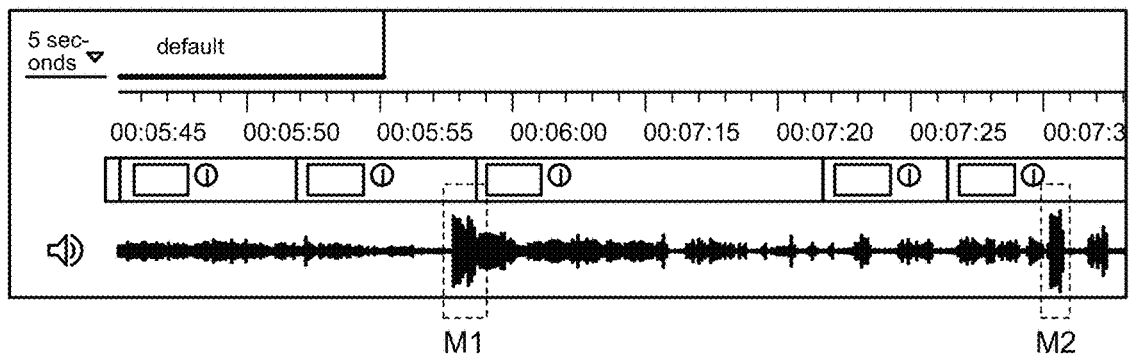
FIG. 8 is a diagram illustrating an example of an analysis result obtained by a related information analysis unit according to the embodiment of the present disclosure.
FIG. 9 is a diagram illustrating an example of analysis performed by a scene analysis unit according to the embodiment of the present disclosure.

FIG. 8 is a diagram illustrating an example of an analysis result obtained by the related information analysis unit 1324 according to the embodiment of the present disclosure. In the example of FIG. 8, the related information analysis unit 1324 analyzes the role, the affiliation group, the importance, and the relationship, for each performer. Note that FIG. 8 also illustrates the performance time period calculated by the content analysis unit 1321.

(Scene Analysis Unit 1323)

Returning to FIG. 4. The scene analysis unit 1323 analyzes each scene of the source content based on the analysis result obtained by the content analysis unit 1321, the sound information of the source content, and the like.

FIG. 9 is a diagram illustrating an example of analysis performed by the scene analysis unit 1323 according to the embodiment of the present disclosure. The scene analysis unit 1323 analyzes sound information of the source content and estimates a scene having a highest excitement in the source content to be classified into "excitement scene".

Based on the wavelength of the sound of the source content, the scene analysis unit 1323 classifies a scene where the vertical length (amplitude) of the wavelength is the largest, into an "excitement scene". Among the waveforms illustrated in FIG. 9, the amplitudes of the regions M1 and M2 are greater than the amplitudes of the other regions. The scene analysis unit 1323 classifies a scene including the region M1 having the greatest amplitude into the "excitement scene". Note that the scene analysis unit 1323 may classify a plurality of scenes into "excitement scenes". For example, the scene analysis unit 1323 may classify scenes including the regions M1 and M2 into "excitement scenes", individually. In this case, the scene analysis unit 1323 can classify the "excitement scenes" by ranking them in descending order of level of amplitude. Examples of the scene where the sound is loud include a scene where a character such as "leading character" makes a loud sound and a scene where the background music is loud.

Figures 10, 11:
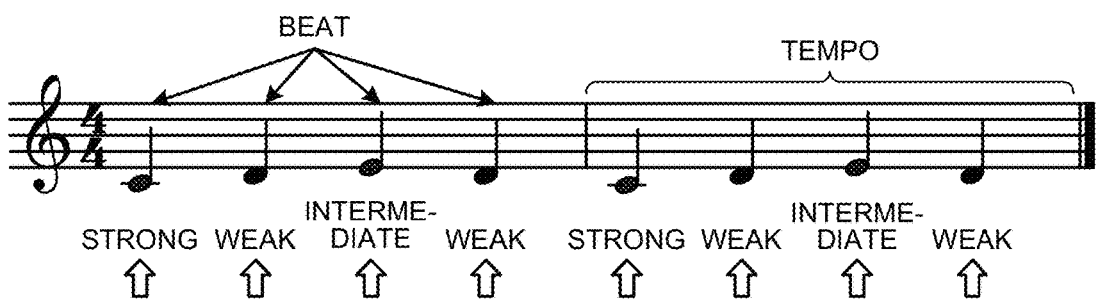
FIG. 10 is a diagram illustrating another example of analysis performed by the scene analysis unit according to the embodiment of the present disclosure.
FIG. 11 is a diagram illustrating analysis performed by a rhythm analysis unit according to the embodiment of the present disclosure.

The scene analysis unit 1323 performs various classifications for each scene in addition to the "excitement scene". FIG. 10 is a diagram illustrating another example of analysis performed by the scene analysis unit 1323 according to the embodiment of the present disclosure.

As illustrated in FIG. 10, the scene analysis unit 1323 classifies characters, groups to which the characters belong, proportions of the characters in the screen (screen occupancy), shots, and the like, for each scene.

For example, the scene analysis unit 1323 analyzes that "AA AA" appears in "group G1" in scene #11. In addition, the scene analysis unit 1323 analyzes that the "AA AA" occupies a small proportion on the screen, and appears in "full shot" in which the entire body is seen on the screen. Furthermore, the scene analysis unit 1323 analyzes that the scene #11 is an "excitement" scene based on the sound information.

(Rhythm Analysis Unit 1322)

Returning to FIG. 4. The rhythm analysis unit 1322 analyzes the rhythm of the sound information (hereinafter, it is simply referred to as a piece of music) attached to the highlight movie. For example, the rhythm analysis unit 1322 analyzes beats and tempo of the piece of music.

FIG. 11 is a diagram illustrating analysis performed by the rhythm analysis unit 1322 according to the embodiment of the present disclosure. As illustrated in FIG. 11, a piece of music has a certain rhythm. The rhythm analysis unit 1322 detects beats generated with a constant rhythm. In addition, in the beats, a "strong beat", an "intermediate beat", a "weak beat", and the like are repeated in a constant cycle. The rhythm analysis unit 1322 detects "strong beat" and "weak beat" repeated at this constant cycle as a "tempo".

Note that the information processing device 100 divides the highlight movie into a plurality of blocks based on the beats detected by the rhythm analysis unit 1322. Details of the block division will be described below.

(Determination Unit 133)

Returning to FIG. 4. The determination unit 133 determines each piece of information to be used for generating the highlight movie based on each piece of information acquired by the acquisition unit 131 and the analysis result obtained by the analysis unit 132. The determination unit 133 includes a block determination unit 1331, a subtitle determination unit 1332, and a scene determination unit 1333.

(Block Determination Unit 1331)

The block determination unit 1331 determines the length of the block in accordance with the generation condition regarding the length of the block acquired by the condition acquisition unit 1313 and with the rhythm of the background music analyzed by the rhythm analysis unit 1322. The block determination unit 1331 determines the length of the block in accordance with the beat of the background music.

Figures 12, 13:
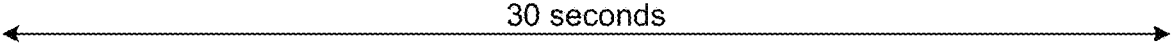
FIG. 12 is a diagram illustrating an example of a length of a block determined by a block determination unit according to the embodiment of the present disclosure.
FIG. 13 is a diagram illustrating an example of a subtitle determined by a subtitle determination unit according to the embodiment of the present disclosure.

FIG. 12 is a diagram illustrating an example of the length of the block determined by the block determination unit 1331 according to the embodiment of the present disclosure. The block determination unit 1331 determines the length of the block in accordance with the beat of the background music within a range being the condition of the length of the block acquired by the condition acquisition unit 1313.

For example, the length condition of the block B1 is 2 to 7 seconds (refer to FIG. 6). Accordingly, the block determination unit 1331 determines the length of the block B1 at the beat timing of the background music analyzed by the rhythm analysis unit 1322. In FIG. 12, the block determination unit 1331 determines the length of the block B1 to be 2 seconds. The block determination unit 1331 similarly determines the lengths of the blocks B2 to B5.

(Subtitle Determination Unit 1332)

Returning to FIG. 4. Based on the textual information related to the source content analyzed by related information analysis unit 1324, the subtitle determination unit 1332 determines a subtitle to be superimposed on the highlight movie. The subtitle determination unit 1332 determines a plurality of subtitles for each block from a summary of the source content or words included in a program guide, for example.

FIG. 13 is a diagram illustrating an example of a subtitle determined by the subtitle determination unit 1332 according to the embodiment of the present disclosure. The subtitle determination unit 1332 determines the subtitles of blocks B1 to B5 from the summary of the source content and the words included in the program guide.

At this time, the subtitle determination unit 1332 can determine the subtitle in accordance with the lengths of the blocks B1 to B5. For example, since the length of the block B1 is 2 seconds, the subtitle determination unit 1332 determines the subtitle of the block B1 so that the length (the number of characters) of the subtitle of the block B1 is a predetermined value or less.

Here, although the subtitle determination unit 1332 determines the subtitle according to the length (time) of the blocks B1 to B5, determination is not limited thereto. For example, the block determination unit 1331 may determine the length of each block so as to meet the condition of the length of the block in accordance with the length (the number of characters) of the subtitle determined by the subtitle determination unit 1332 and with the rhythm of the background music.

(Scene Determination Unit 1333)

Returning to FIG. 4. Based on the rule information acquired by the rule acquisition unit 1312, the scene determination unit 1333 determines (extracts) a scene to be used for generating a highlight movie for each block. The scene determination unit 1333 includes a rule correction unit 1333a.

(Rule Correction Unit 1333a)

The rule correction unit 1333a corrects the rule information in accordance with the subtitle determined by the subtitle determination unit 1332. For example, the name of the character of the source content may be included in the subtitle determined by the subtitle determination unit 1332. In this case, the situation where the character does not appear in the block on which the subtitle is superimposed would give the viewer of the highlight movie an uncomfortable feeling.

In this manner, the situation where the scene does not match the keyword (for example, the name of the person or the name of the location, etc.) included in the subtitle would give the viewer of the highlight movie an uncomfortable feeling. In this case, rule correction unit 1333a corrects the rule information so as to extract the scene related to the keyword included in the subtitle.

FIG. 14 is a diagram illustrating an example of correction made by the rule correction unit 1333a according to the embodiment of the present disclosure.

As illustrated in FIG. 13, the character names of the source content are included in the subtitles corresponding to the blocks B2 and B3 out of the subtitles determined by the subtitle determination unit 1332.

Therefore, as illustrated in FIG. 14, the rule correction unit 1333a corrects the rule information (rules R2 and R3) corresponding to the blocks B2 and B3, respectively. For example, the subtitle corresponding to the block B2 includes the name of the character "HH HH". Therefore, the rule correction unit 1333a corrects the rule R2 so as to extract a scene related to "HH HH". For example, the rule correction unit 1333a changes the rule R2 to three of "Solo performance of HH", "Presenting sub-cast of group to which HH belongs in order of performance time period", and "Scene including performance of plurality of actors including HH/sub-cast" in descending order of priority.

Similarly, the rule correction unit 1333a corrects the rule R3.

Returning to FIG. 4, the scene determination unit 1333 extracts a scene for each block of the highlight movie based on the rule information corrected by the rule correction unit 1333a.

For example, the scene determination unit 1333 attaches a score according to a priority order to a scene that matches a detailed rule included in the rule information, and extracts a scene with a high score as content data corresponding to the block. Content data is data used to generate the highlight movie. The information processing device 100 connects pieces of content data to generate a highlight movie as described below.

Here, in a case where the length of the extracted scene is longer than the length of the block, the scene determination unit 1333 can clip a part of the scene (hereinafter, also described as a partial scene) in accordance with the length of the block to generate content data.

Furthermore, in a case where the length (time) of the block is a predetermined value or more, the scene determination unit 1333 may divide the block into a plurality of parts and extract a plurality of scenes for individual divided parts. The scene determination unit 1333 connects the plurality of extracted scenes to generate content data corresponding to the block.

Although this is an example in which the scene determination unit 1333 extracts the content data for each block by scoring the scenes according to the priority order of the detailed rule, extraction of content data is not limited thereto. For example, the scene determination unit 1333 may extract the content data for each block from the source content based on machine learning.

(Generation Unit 134)

The generation unit 134 connects the content data determined by the scene determination unit 1333 to generate a highlight movie.

Figure 15:
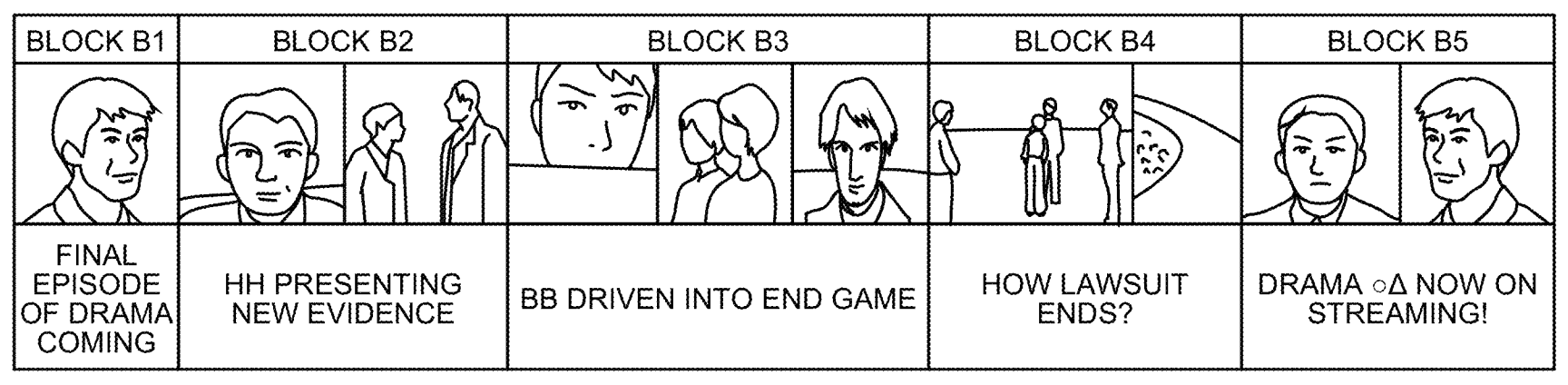

FIG. 15 is a diagram illustrating an example of a highlight movie generated by the generation unit 134 according to the embodiment of the present disclosure. The generation unit 134 superimposes the subtitle determined by the subtitle determination unit 1332 on the content data extracted by the scene determination unit 1333 for each of the blocks B1 to B5, and then connects individual pieces of content data to generate a highlight movie.

<<3. Generation Processing>>

Figure 16:
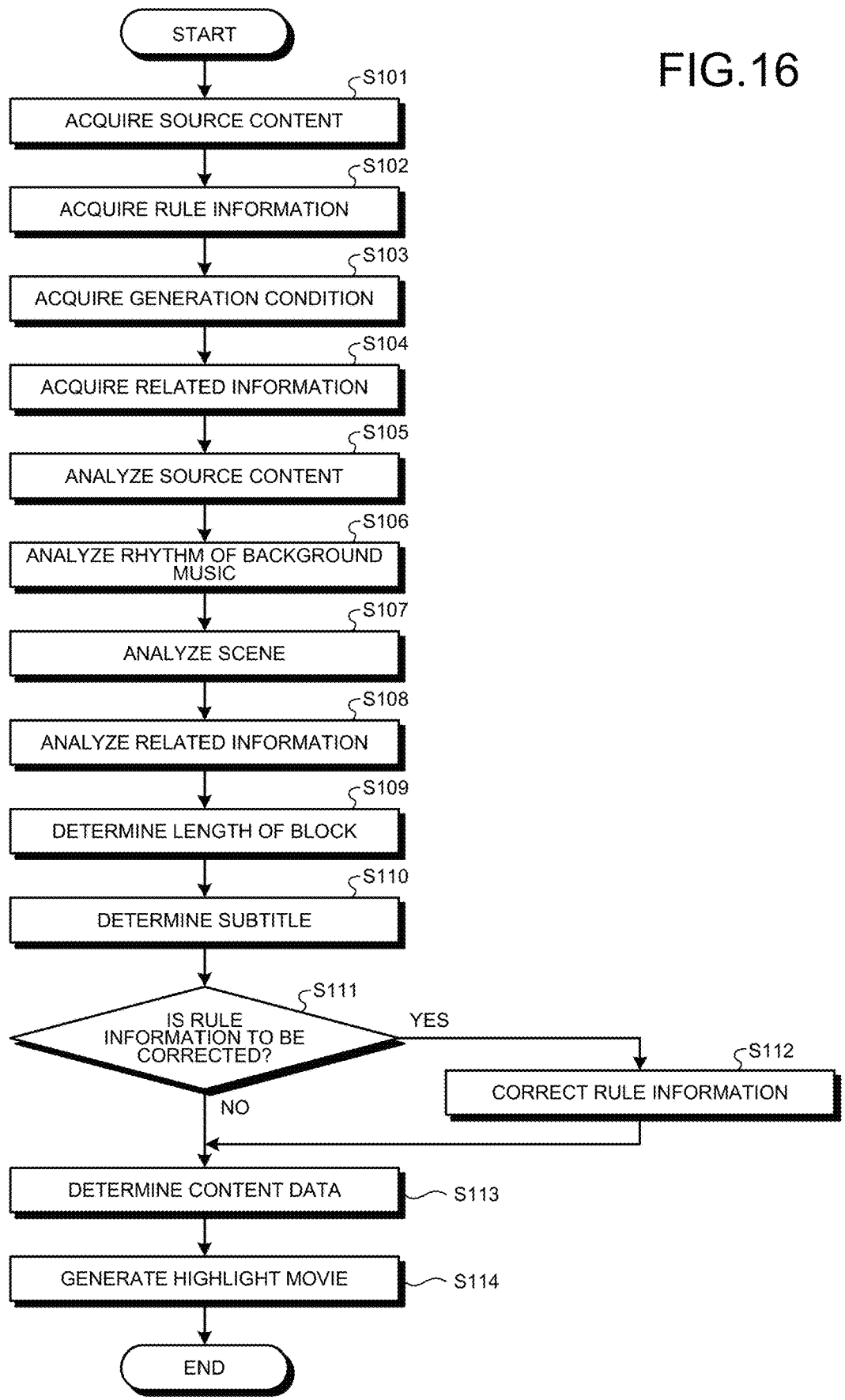
FIG. 16 is a flowchart illustrating an example of generation processing executed by the information processing device according to the embodiment of the present disclosure.

Next, highlight movie generation processing executed by the information processing device 100 will be described. FIG. 16 is a flowchart illustrating an example of generation processing executed by the information processing device 100 according to the embodiment of the present disclosure. In a case where an instruction from the user is received via the terminal device 300, the information processing device 100 executes the generation processing of FIG. 16.

The information processing device 100 acquires one or more movie content as source content from the terminal device 300 (step S101). Furthermore, the information processing device 100 acquires a plurality of pieces of rule information from the terminal device 300 (step S102).

The information processing device 100 acquires, from the terminal device 300, a generation condition to be used for generating a highlight movie (step S103). The information processing device 100 acquires related information regarding the source content (step S104).

Next, the information processing device 100 analyzes the source content using the analysis device 200 (step S105). Furthermore, the information processing device 100 analyzes the rhythm of the background music (step S106).

The information processing device 100 analyzes the scene of the source content (step S107) and analyzes the related information (step S108).

The information processing device 100 determines the length of the block within the range of the generation condition based on the analysis result (step S109). The information processing device 100 determines a subtitle based on the analysis result of the related information (step S108).

The information processing device 100 determines whether to correct the rule information in accordance with the determined subtitle (S111).

When having determined that the rule information needs to be corrected (step S111; Yes), the information processing device 100 corrects the rule information in accordance with the subtitle, and proceeds to step S113 (step S112).

When having determined that the rule information does not need to be corrected (step S111; No), the information processing device 100 determines each piece of content data corresponding to each block based on the rule information (step S113).

The information processing device 100 connects the pieces of content data to generate a highlight movie (step S114).

<<4. Other Embodiments>>

The processing according to the above-described embodiments and modifications may be performed in various different forms (modifications) other than the above-described embodiments and modifications.

In the description of the above-described embodiment, the information processing device 100 acquires the movie content and analyzes the movie content using the analysis device 200, but the acquisition target is not limited thereto. The information processing device 100 may acquire analyzed content, which is an analysis result of the movie content, from the terminal device 300 instead of the movie content. In this manner, the information processing device 100 only needs to acquire the content information regarding the movie content used for generating the highlight movie, and does not need to acquire the movie content itself.

In the above description of the embodiment, the information processing device 100 generates the subtitle from the textual content (for example, a summary of movie content or a program guide) related to the movie content, but details of generation is not limited thereto. For example, the information processing device 100 may acquire the subtitle information regarding the highlight movie from the terminal device 300.

In this manner, the information (analyzed content, subtitle, or the like) to be generated by the information processing device 100 in the description of the above-described embodiment may be acquired by the information processing device 100 from another device (for example, the terminal device 300).

Alternatively, the information (for example, rule information and generation conditions) to be acquired by the information processing device 100 from another device (for example, the terminal device 300) in the description of the above-described embodiment may be generated by the information processing device 100 itself. In this case, the information processing device 100 may generate the information based on information stored in advance in the storage unit 120, or may generate the information by using machine learning, for example.

In the description of the above-described embodiment, the information processing device 100 generates one highlight movie from one piece of movie content, but the generation of the movie is not limited thereto. The information processing device 100 may generate one highlight movie from a plurality of pieces of movie content.

Furthermore, the information processing device 100 may generate a plurality of highlight movies from one movie content. In this case, the information processing device 100 may generate a plurality of highlight movies by using a plurality of pieces of rule information different for each highlight movie. Alternatively, the information processing device 100 may generate a plurality of highlight movies by using the same plurality of pieces of rule information. In this case, the information processing device 100 may change the weighting of the detailed rule for each highlight movie, or may change the length of the block, the subtitle, the excitement of the highlight movie, or the like for each of the plurality of highlight movies.

Furthermore, the information processing device 100 may generate a plurality of highlight movies from a plurality of pieces of movie content. In this case, the information processing device 100 may generate a highlight movie corresponding to each of the plurality of pieces of movie content, or may generate a plurality of highlight movies from the plurality of movie content integrated as one source content.

Furthermore, among each processing described in the above embodiments, all or a part of the processing described as being performed automatically can be manually performed, or the processing described as being performed manually can be performed automatically by a known method. In addition, the processing procedures, specific names, and information including various data and parameters illustrated in the above Literatures or drawings can be arbitrarily altered unless otherwise specified. For example, various types of information illustrated in each of the drawings are not limited to the information illustrated.

In addition, each of components of each device is provided as a functional and conceptual illustration and thus does not necessarily need to be physically configured as illustrated. That is, the specific form of distribution/integration of each device is not limited to those illustrated in the drawings, and all or a part thereof may be functionally or physically distributed or integrated into arbitrary units according to various loads and use conditions.

Furthermore, the above-described embodiments can be appropriately combined within a range implementable without contradiction of processes.

<<5. Hardware Configuration>>

Figure 17:
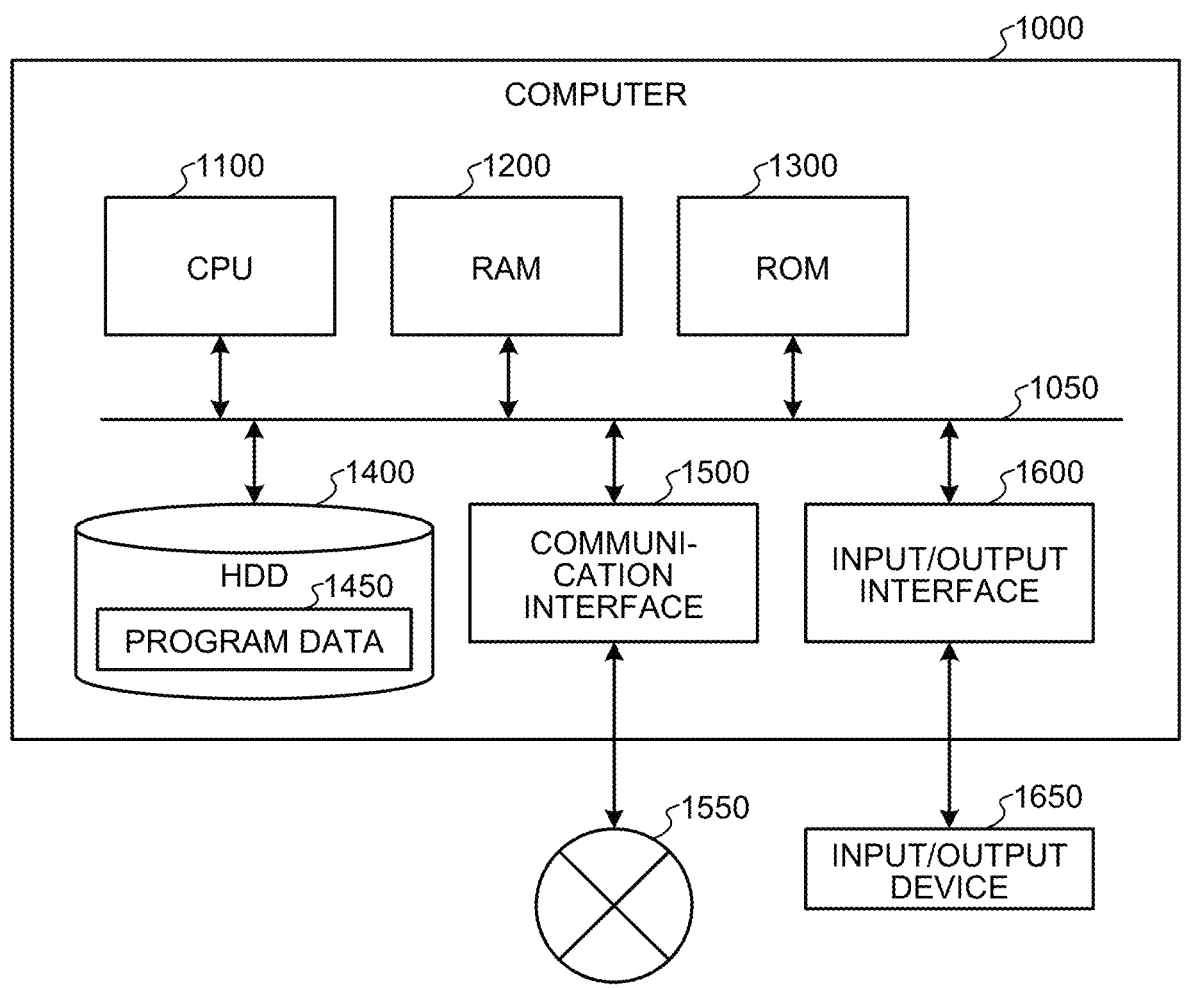
FIG. 17 is a hardware configuration diagram illustrating an example of a computer that implements functions of an information processing device and an analysis device.

The information device such as the information processing device 100 and the analysis device 200 according to the above-described embodiments and modifications are implemented by a computer 1000 having a configuration as illustrated in FIG. 17, for example. FIG. 17 is a hardware configuration diagram illustrating an example of a computer that implements functions of the information processing device 100 and the analysis device 200. Hereinafter, the information processing device 100 according to the embodiment will be described as an example. The computer 1000 includes a CPU 1100, RAM 1200, read only memory (ROM) 1300, a hard disk drive (HDD) 1400, a communication interface 1500, and an input/output interface 1600. Individual components of the computer 1000 are interconnected by a bus 1050.

The CPU 1100 operates based on a program stored in the ROM 1300 or the HDD 1400 so as to control each of components. For example, the CPU 1100 develops the program stored in the ROM 1300 or the HDD 1400 into the RAM 1200 and executes processing corresponding to various programs.

The ROM 1300 stores a boot program such as a basic input output system (BIOS) executed by the CPU 1100 when the computer 1000 starts up, a program dependent on hardware of the computer 1000, or the like.

The HDD 1400 is a non-transitory computer-readable recording medium that records a program executed by the CPU 1100, data used by the program, or the like. Specifically, the HDD 1400 is a recording medium that records an information processing program according to the present disclosure, which is an example of program data 1450.

The communication interface 1500 is an interface for connecting the computer 1000 to an external network 1550 (for example, the Internet). For example, the CPU 1100 receives data from other devices or transmits data generated by the CPU 1100 to other devices via the communication interface 1500.

The input/output interface 1600 is an interface for connecting between an input/output device 1650 and the computer 1000. For example, the CPU 1100 receives data from an input device such as a keyboard or a mouse via the input/output interface 1600. In addition, the CPU 1100 transmits data to an output device such as a display, a speaker, or a printer via the input/output interface 1600. Furthermore, the input/output interface 1600 may function as a media interface for reading a program or the like recorded on predetermined recording media. Examples of the media include optical recording media such as a digital versatile disc (DVD) or a phase change rewritable disk (PD), a magneto-optical recording medium such as a magneto-optical disk (MO), a tape medium, a magnetic recording medium, and semiconductor memory.

For example, when the computer 1000 functions as the information processing device 100 according to the embodiment, the CPU 1100 of the computer 1000 executes the information processing program loaded on the RAM 1200 so as to implement the functions of the control unit 130 and the like. In addition, the HDD 1400 stores a program according to the present disclosure and data in the storage unit 120. While the CPU 1100 executes program data 1450 read from the HDD 1400, the CPU 1100 may acquire these programs from another device via the external network 1550, as another example.

<<6. Conclusion>>

As described above, according to the embodiment of the present disclosure, the information processing device 100 includes the scene determination unit 1333 (an example of a scene extraction unit) and the generation unit 134. The scene determination unit 1333 extracts a plurality of pieces of content data (an example of highlight scene) from the source content (an example of content information related to movie content) based on each of a plurality of pieces of rule information (an example of generation rules) for generating a highlight movie. The generation unit 134 connects a plurality of pieces of content data to generate a highlight movie. This makes it possible for the information processing device 100 to more easily generate a highlight movie having a high effect of promoting content viewing.

Furthermore, according to the embodiment of the present disclosure, the information processing device 100 further includes the subtitle determination unit (an example of a subtitle acquisition unit) that acquires a plurality of subtitles (an example of subtitle information) related to the highlight movie. The generation unit 134 generates a highlight movie by superimposing a plurality of subtitles corresponding to a plurality of pieces of content data. This makes it possible for the information processing device 100 to more easily generate a highlight movie having a high effect of promoting content viewing.

Furthermore, in accordance with the embodiment of the present disclosure, the information processing device 100 further includes the rule correction unit 1333a that corrects rule information in accordance with the subtitle. The scene determination unit 1333 extracts content data based on the corrected rule information. As a result, the information processing device 100 can generate a highlight movie corresponding to the information in the subtitle.

Furthermore, according to the embodiment of the present disclosure, the information processing device 100 acquires a plurality of subtitles from textual content related to the highlight movie. This makes it possible for the information processing device 100 to more easily generate a highlight movie having a high effect of promoting content viewing.

Furthermore, according to the embodiment of the present disclosure, the rule information includes information regarding characters in the movie content. This makes it possible for the information processing device 100 to more easily generate a highlight movie having a high effect of promoting content viewing.

Furthermore, according to the embodiment of the present disclosure, the rule information includes information for extracting content data including characters based on a relationship chart (an example of relationship information) indicating a relationship between characters. This makes it possible for the information processing device 100 to more easily generate a highlight movie having a high effect of promoting content viewing.

Furthermore, according to the embodiment of the present disclosure, the rule information includes information for extracting content data including characters belonging to the same group as a predetermined character in a case where a plurality of characters are classified into a plurality of groups based on the relationship chart. This makes it possible for the information processing device 100 to more easily generate a highlight movie having a high effect of promoting content viewing.

Furthermore, according to the embodiment of the present disclosure, the rule information includes information for extracting content data including the characters according to at least one of the number of characters, the occupancy size of the characters on the screen, and the appearance time period. This makes it possible for the information processing device 100 to more easily generate a highlight movie having a high effect of promoting content viewing.

Furthermore, according to an embodiment of the present disclosure, the information processing device 100 further includes the scene analysis unit 1323 (an example of an estimation unit) that estimates excitement of movie content based on sound information included in the movie content. The rule information includes information for extracting excitement as content data. This makes it possible for the information processing device 100 to generate a highlight movie at least partially including an excitement scene.

Furthermore, according to an embodiment of the present disclosure, the information processing device 100 further includes the block determination unit 1331 (an example of a determination unit) that determines the time of a plurality of highlight scenes based on the number of pieces of rule information, the time of the highlight movie, and music (background music) to be attached to the highlight movie. This makes it possible for the information processing device 100 to more easily generate a highlight movie having a high effect of promoting content viewing.

Furthermore, according to an embodiment of the present disclosure, the block determination unit 1331 determines the time of a plurality of pieces of content data in accordance with a beat of music. This makes it possible for the information processing device 100 to reduce the uncomfortable feeling to be given to the viewer of the highlight movie in the switching of the content data.

Furthermore, the effects described in the present specification are merely illustrative or exemplary and are not limited. That is, the technology according to the present disclosure can exhibit other effects that are apparent to those skilled in the art from the description of the present specification in addition to or instead of the above effects.

Note that the present technology can also take the following configurations.

(1)
An information processing device comprising:
a scene extraction unit that extracts a plurality of highlight scenes from content information related to movie content based on each of a plurality of generation rules for generating a highlight movie; and
a generation unit that connects the plurality of highlight scenes to generate the highlight movie.

(2)
The information processing device according to (1), further comprising
a subtitle acquisition unit that acquires a plurality of pieces of subtitle information related to the highlight movie,
wherein the generation unit superimposes the plurality of pieces of subtitle information corresponding to the plurality of highlight scenes to generate the highlight movie.

(3)
The information processing device according to (2), further comprising
a rule correction unit that corrects the generation rule in accordance with the subtitle information,
wherein the scene extraction unit extracts the highlight scene based on the corrected generation rule.

(4)
The information processing device according to (2) or (3), wherein the subtitle acquisition unit acquires the plurality of pieces of subtitle information from textual content related to the highlight movie.

(5)
The information processing device according to any one of (1) to (4), wherein the generation rule includes information related to characters of the movie content.

(6)
The information processing device according to (5), wherein the generation rule includes information for extracting the highlight scene including the characters based on relationship information indicating a relationship between the characters.

(7)
The information processing device according to (6), wherein the generation rule includes information for extracting the highlight scene including the characters belonging to a same group as a predetermined one of the characters when a plurality of the characters are classified into groups based on the relationship information.

(8)
The information processing device according to any one of (5) to (7), wherein the generation rule includes information for extracting the highlight scene including the characters according to at least one of a number of the characters, an occupancy size of the characters on a screen, and an appearance time period of the character.

(9)
The information processing device according to any one of (1) to (8), further comprising
an estimation unit that estimates excitement of the movie content based on sound information included in the movie content,
wherein the generation rule includes information for extracting the excitement as the highlight scene.

(10)
The information processing device according to any one of (1) to (9), further comprising a determination unit that determines time periods of the plurality of highlight scenes based on a number of generation rules, a time period of the highlight movie, and music to be attached to the highlight movie.

(11)
The information processing device according to (10), wherein the determination unit determines time periods of the plurality of highlight scenes in accordance with a beat of the music.

(12)
An information processing method comprising:
extracting a plurality of highlight scenes from content information related to movie content based on each of a plurality of generation rules for generating a highlight movie; and
connecting the plurality of highlight scenes to generate the highlight movie.

(13)
A program causing a computer to execute processing comprising:
extracting a plurality of highlight scenes from content information related to movie content based on each of a plurality of generation rules for generating a highlight movie; and
connecting the plurality of highlight scenes to generate the highlight movie.

REFERENCE SIGNS LIST

100 INFORMATION PROCESSING DEVICE
110, 210 I/F UNIT
120, 240 STORAGE UNIT
130, 230 CONTROL UNIT
131 ACQUISITION UNIT
132 ANALYSIS UNIT
133 DETERMINATION UNIT
134 GENERATION UNIT
200 ANALYSIS DEVICE
220 DECODER UNIT

300 TERMINAL DEVICE
1311 CONTENT ACQUISITION UNIT
1312 RULE ACQUISITION UNIT
1313 CONDITION ACQUISITION UNIT
1314 RELATED INFORMATION ACQUISITION UNIT
1321 CONTENT ANALYSIS UNIT
1322 RHYTHM ANALYSIS UNIT
1323 SCENE ANALYSIS UNIT
1324 RELATED INFORMATION ANALYSIS UNIT
1331 BLOCK DETERMINATION UNIT
1332 SUBTITLE DETERMINATION UNIT
1333 SCENE DETERMINATION UNIT
1333a RULE CORRECTION UNIT

The invention claimed is:

1. An information processing device comprising:
circuitry configured to
extract a plurality of highlight scenes from content information related to movie content based on each of a plurality of generation rules to generate a highlight movie;
acquire a plurality of pieces of subtitle information related to the highlight movie;
correct the generation rule in accordance with the subtitle information and extract at least one highlight scene of the plurality of highlight scenes based on the corrected generation rule; and
connect the plurality of highlight scenes and superimpose the plurality of pieces of subtitle information corresponding to the plurality of highlight scenes to generate the highlight movie.

2. The information processing device according to claim 1, wherein the circuitry is configured to acquire the plurality of pieces of subtitle information from textual content related to the highlight movie.

3. The information processing device according to claim 1, wherein the generation rule includes information related to characters of the movie content.

4. The information processing device according to claim 3, wherein the generation rule includes information for extracting the highlight scene including the characters based on relationship information indicating a relationship between the characters.

5. The information processing device according to claim 4, wherein the generation rule includes information for extracting the highlight scene including the characters belonging to a same group as a predetermined one of the characters when a plurality of the characters are classified into groups based on the relationship information.

6. The information processing device according to claim 3, wherein the generation rule includes information for extracting the highlight scene including the characters according to at least one of a number of the characters, an occupancy size of the characters on a screen, and an appearance time period of the character.

7. The information processing device according to claim 1, wherein the circuitry is configured to
estimate excitement of the movie content based on sound information included in the movie content,
wherein the generation rule includes information for extracting the excitement as the highlight scene.

8. The information processing device according to claim 1, wherein the circuitry is configured to determine time periods of the plurality of highlight scenes based on a number of generation rules, a time period of the highlight movie, and music to be attached to the highlight movie.

9. The information processing device according to claim 8, wherein the circuitry is configured to determine time periods of the plurality of highlight scenes in accordance with a beat of the music.

10. An information processing method comprising:
extracting a plurality of highlight scenes from content information related to movie content based on each of a plurality of generation rules to generate a highlight movie;
acquiring a plurality of pieces of subtitle information related to the highlight movie;
correcting the generation rule in accordance with the subtitle information and extracting at least one highlight scene of the plurality of highlight scenes based on the corrected generation rule; and
connecting the plurality of highlight scenes and superimpose the plurality of pieces of subtitle information corresponding to the plurality of highlight scenes to generate the highlight movie.

11. A non-transitory computer readable medium storing instructions causing a computer to execute a process comprising:
extracting a plurality of highlight scenes from content information related to movie content based on each of a plurality of generation rules to generate a highlight movie;
acquiring a plurality of pieces of subtitle information related to the highlight movie;
correcting the generation rule in accordance with the subtitle information and extracting at least one highlight scene of the plurality of highlight scenes based on the corrected generation rule; and
connecting the plurality of highlight scenes and superimpose the plurality of pieces of subtitle information corresponding to the plurality of highlight scenes to generate the highlight movie.

12. The information processing device according to claim 1, wherein the circuitry is configured to receive movie data as source content and decode the movie data received.

13. The information processing device according to claim 12, wherein the circuitry is configured to divides the movie data into a plurality of scenes based on at least one of video recognition result, speech information recognized, the utterance information recognized, and textual information recognized.

14. The information processing device according to claim 13, wherein the circuitry is configured to select a scene from the plurality of scenes that matches each of a plurality of pieces of rule information.

* * * * *